United States Patent
Batchelor et al.

(10) Patent No.: US 6,833,076 B1
(45) Date of Patent: Dec. 21, 2004

(54) WATER TREATMENT

(75) Inventors: Stephen Norman Batchelor, Wirral (GB); Denise Angela Carr, Wirral (GB); Robert John Crawford, Wirral (GB); Lynette Fairclough, Wirral (GB)

(73) Assignee: Unilever Home & Personal Care USA, a division of Conopco, Inc., Greenwich, CT (US)

( * ) Notice: Subject to any disclaimer, the term of this patent is extended or adjusted under 35 U.S.C. 154(b) by 114 days.

(21) Appl. No.: 10/149,784

(22) PCT Filed: Nov. 13, 2000

(86) PCT No.: PCT/EP00/11354

§ 371 (c)(1), (2), (4) Date: Aug. 29, 2002

(87) PCT Pub. No.: WO01/44127

PCT Pub. Date: Jun. 21, 2001

(30) Foreign Application Priority Data

Dec. 15, 1999 (GB) .............................. 9929694

(51) Int. Cl.[7] .............................. C02F 1/32; C02F 1/72
(52) U.S. Cl. ...................... 210/748; 210/749; 210/766; 210/917
(58) Field of Search ................................. 210/749, 748, 210/766, 757, 758, 917

(56) References Cited

U.S. PATENT DOCUMENTS

| 4,246,105 A | | 1/1981 | Rohrer |
| 5,174,904 A | * | 12/1992 | Smith, II ..................... 210/748 |
| 5,256,308 A | * | 10/1993 | Dulany ....................... 210/712 |
| 5,273,662 A | * | 12/1993 | Muisener et al. ........... 210/734 |
| 5,389,356 A | | 2/1995 | Aust et al. |
| 6,139,755 A | * | 10/2000 | Marte et al. ................ 210/752 |
| 6,319,412 B1 | * | 11/2001 | Reyna ........................ 210/666 |

FOREIGN PATENT DOCUMENTS

| DE | 197 26 241 A1 | | 12/1998 |
| JP | 51-121959 A | * | 10/1976 |
| WO | 94/16056 | | 7/1994 |
| WO | 98/57895 | | 12/1998 |

OTHER PUBLICATIONS

Patents Act 1977 Search Report (GB 9929694.9).
International Search Report (PCT/EP 00/11354).

* cited by examiner

Primary Examiner—Frank M. Lawrence
(74) Attorney, Agent, or Firm—Alan A. Bornstein

(57) ABSTRACT

A method for the treatment of waste water by the generation of radicals in the waste water comprises applying to the waste water at least one substance which is capable of providing radicals in the waste water. The substance decomposes by a unimolecular mechanism or by hydrogen abstraction to form a carbon-containing radical on exposure to light or heat.

13 Claims, No Drawings

WATER TREATMENT

This invention relates to the treatment of waste water. The invention finds particular utility in the treatment of waste water from a domestic laundry process which water contains dyestuffs.

BACKGROUND OF THE INVENTION

Waste water is the aqueous residue which is usually discarded following domestic or industrial processes eg, for the treatment of fabrics or textiles.

Water pollution is a major problem world-wide. One aspect of the problem is the discoloration of waste water due to the presence of organic dyes from domestic processes (eg, processes involving laundry and foods) and industrial processes (eg, in the textile, food, beverages, pharmaceutical, cosmetics, plastics, paper, leather, printing inks, paint, varnish, lacquer and wood stain industries).

Due to the high extinction coefficients of the dyes, only very small quantities (eg, a few parts per million) are required to give discoloration. The dyes present are generally chemically very stable making them difficult to remove. Common methods to remove such pollution are filtration, reverse osmosis and flocculation. However, these treatments are expensive (see P. Pitter and P. Chudoba, Biodegradability of Organic Substances in the Aquatic Environment, CRC Press: Boca Raton, 1994).

WO 94/16056 discloses a process for the destruction of toxic waste materials, such as chlorinated hydrocarbons by the use of free-radical chemistry. In that patent the free radicals are generated by a free radical generating catalyst (generally a white-rot fungus peroxidase) in the presence of a mediator compound and a reductant.

WO 98/57895 relates to the oxidation of sewage by a radical process maintained by the incorporation of a radical starter, a catalyst and oxygen into the sewage flow.

U.S. Pat. No. 4,246,105 discloses a process for purifying water using free peroxygen radicals generated by means of radiation or electrical means.

It is known that hydroxy (HO.) or alkoxy (RO.) radicals produced via Fenton chemistry can decompose pollutants (see, for example, Halmann, M. Photodegradation of water pollutants; CRC Press: Boca Raton, Fla., 1996). However, these systems require the presence of transition metals in the water, which can be difficult to remove after treatment.

There remains a need for systems for the treatment of waste water which do not involve the addition of transition metal compounds, or other undesirable compounds, to the waste water. It is an object of the invention to provide such systems.

Radical initiators, which decompose to form radicals on exposure to light or to heat, are themselves well-known and are used in the unrelated fields of polymerisation, polymer cross-linking and curing reactions in materials.

DEFINITION OF THE INVENTION

According to the invention, there is provided a method for the treatment of waste water by the generation of radicals in the waste water, which comprises applying to the waste water at least one radical photo- or thermal-initiator which is capable of providing radicals in the waste water, wherein the substance is capable of decomposing by a unimolecular (bond-cleavage) mechanism to form a carbon-centred radical on exposure to light or to heat.

Carbon-centred radicals are those in which the unpaired electron in the radical is most stable at or near to a carbon atom. These differ from the oxygen and peroxygen radicals described above.

The method of the invention has been found to be capable of removing the colour from waste water which is discoloured, particularly where the discoloration of the waste water is caused by one or more organic dyes. It can also kill certain bacteria present in the waste water.

The method of the invention can decolourise waste water relatively rapidly and does not add any compounds to the waste water which may cause it to become coloured (such as transition metal ions). Also, the decomposition products which are formed from the substance can be more readily biodegradable than the residual products of conventional compounds for treating waste water.

DETAILED DESCRIPTION OF THE INVENTION

The radicals which are formed by the decomposition of the substance can react directly with the agents responsible for the colour ("the colouring agents") of the waste water and/or the bacteria in the waste water to decolourise the waste water and/or kill the bacteria. Alternatively, or additionally, the radicals formed following decomposition of the substance can react to form further radicals in the waste water which then go on to react with the colouring agents and/or the bacteria. It is known that free is radicals, generated by other means and in different systems, can react with dyes in aqueous solution and kill bacteria.

Surprisingly, small quantities of these substances give excellent decolouration of waste water which contains one or more organic dyes. The invention can cause complete decolouration of the waste water to form a product which, if no other coloured solid or liquid impurities are present, may be colourless. Alternatively, the invention can cause incomplete or partial decolouration, either due to incomplete reaction with coloured impurities or due to the presence of other impurities, such as suspended solids, in the waste water.

Where the substance is water soluble, it can preferably be used at a concentration of $10^{-9}$ M to 1 M, more preferably $10^7$ M to $10^{-4}$ M.

The initiators which can be used in the present invention decompose by a unimolecular mechanism to form radicals on exposure to light or heat.

In the method of the invention, the substance is caused to form radicals by treatment with heat and/or light. The heat may be provided by the thermal energy of the waste water itself or an external heat source may be used to activate the substance to cause ii to form radicals. Light may be provided by ambient light (eg, sunlight) or by a source of artificial illuminations such as from a lamp using a tungsten filament or gas discharge.

Unimolecular (bond cleavage) radical photoinitiators operate according to the following reaction:

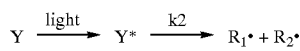

where k2 is the rate constant of the bond-cleavage reaction. Preferably, k2 is greater than $10^6$ s$^{-1}$.

Suitable bond cleavage radical initiators may be selected from the following groups:

(a) alpha amino ketones, particularly those containing a benzoyl moiety, otherwise called alpha-amino acetophenones, for example 2-methyl 1-[4-phenyl]-2- morpholinopropan-1-one (Irgacure 907, trade mark), (2-benzyl-2-dimethyl amino-1-(4-morpholinophenyl)-butan-1-one (Irgacure 369, trade mark);

(b) alphahydroxy ketones, particularly alpha-hydroxy acetophenones, eg (1-[4-(2-hydroxyethoxy)-phenyl]-2-hydroxy-2-methyl-1-propan-1-one) (Irgacure 2959, trade mark), 1-hydroxy-cyclohexyl-phenyl-ketone (Irgacure 184, trade mark);

(c) phosphorus-containing photoinitiators, including monoacyl and bisacyl phosphine oxide and sulphides, for example 2-4-6-(trimethylbenzoyl)diphenyl-phosphine oxide, bis(2,4,6-trimethylbenzoyl)-phenyl-phosphine oxide (Irgacure 819, trade mark), (2,4,6-trimethylbenzoyl)phenyl phosphinic acid ethyl ester (Lucerin TPO-L (trade mark) ex BASF);

(d) dialkoxy acetophenones;

(e) alpha-haloacetophenones;

(f) trisacyl phosphine oxides; and, (g) bezoin and bezoin-based photoinitiators.

Suitable radical photoinitiators are disclosed in WO 9607662 (trisacyl phosphine oxides), U.S. Pat. No. 5,399,782 (phosphine sulphides), U.S. Pat. No. 5,410,060, EP-A-57474, EP-A-73413 (phosphine oxides), EP-A-088050, EP-A-0117233, EP-A-0138754, EP-A-0446175 and U.S. Pat. No. 4,559,371.

Other suitable radical photoinitiators are disclosed in EP-A-0003002 in the name of Ciba Geigy, EP-A-0446175 in the name of Ciba Geigy, GB 2259704 in the name of Ciba Geigy (alkyl bisacyl phosphine oxides), U.S. Pat. No. 4,792,632 (bisacyl phosphine oxides), U.S. Pat. No. 5,554,663 in the name of Ciba Geigy (alpha amino acetophenones), U.S. Pat. No. 5,767,169 (alkoxy phenyl substituted bisacyl phosphine oxides) and U.S. Pat. No. 4,719,297 (acylphosphine compounds).

Radical photoinitiators are discussed in general in A. F. Cunningham, V. Desorby, K. Dietliker, R. Husler and D. G. Leppard, Chemia 48 (1994) 423426 and H. F. Gruber, Prog. Polym. Sci., 17, (1992), 953–1044.

The preferred radical photoinitiators undergo one of the reactions set out above when excited by radiation falling generally in the range 290–800 nm. For example, natural sunlight, which comprises light in this region, will be suitable for causing the radical photoinitiator to undergo one of the reactions described above. Preferably, the radical photoinitiator has a maximum extinction coefficient in the ultraviolet range (290–400 an) which is greater than 100 mol$^{-1}$1 cm$^{-1}$. Suitably, the radical photoinitiator is a solid or a liquid at room temperature.

Suitably, the radical photoinitiator is substantially colourless and gives non-coloured photo products upon undergoing one of the reactions set out above.

Optionally, the compositions comprise sensitisers such as thioxanthones, for example as described in EP-A-0088050, EP-A-0138754.

The radical photoinitiators are preferably activated by ambient light eg, domestic lighting or sunlight. However, a separate light source may be employed for activation of the photoinitiator.

In the alternative, the substance which is used in the present invention may be a thermal initiator which decomposes to form radicals on heating. As will be apparent, there will be some degree of overlap between the different classes of substances which may be used in these two aspects of the invention. Some radical photoinitiators also decompose by heating (particularly at higher temperatures) and some thermal initiators decompose on exposure to light (particularly at shorter wavelengths). The following schematic reaction scheme illustrates this process:

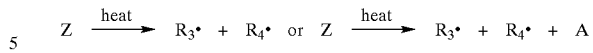

where $R_3\bullet$ and $R_4\bullet$, which can be the same or different, are radicals formed from Z, and A, when formed, is a non-radical molecule.

Suitable substances which decompose on heating include compounds comprising an azo group which decompose according to the following reaction:

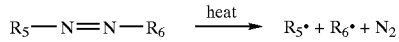

The thermal initiators preferably decompose at ambient temperature, in which case the thermal initiators are stored at below ambient temperature and the heating which causes them to decompose is effected by the increase in temperature when they are added to the waste water which is at or above ambient temperature. Conveniently, many waste water streams have a temperature at or above ambient. Temperatures to which the thermal initiators should be heated to cause them to decompose are preferably in the range of up to 100° C., more preferably from 5° C. to 90° C., most preferably 5° C. to 40° C.

The use of thermal initiators is preferred for the treatment of waste waters which are highly coloured, as, when the waste waters are highly coloured, the high absorbance of the waste waters may prevent or inhibit photoinitiators.

The substances which are used in the method of the invention are preferably biodegradable and non-toxic. The decomposition products of the substances, which are formed from the radicals which they decompose into, are also preferably biodegradable and non-toxic.

Surprisingly, it has been found that the substances for use in the method of the invention are effective when they are water soluble and when they are substantially insoluble in water.

The use of substantially insoluble substances allows minimum amounts of the substances to be used. Insolubility also permits the substance to be used in the form of a solid body of substance or a substrate having the substance applied thereto (eg, a coated substrate) which can be brought into contact with the waste water. For example, a solid body of the substance or a substrate coated with the substance can be dipped into the waste water or can be arranged such that waste water flows past it.

The efficiency of the initiators can be increased by removing oxygen from the waste water eg, by passage through the waste water of inert gases such as nitrogen, carbon dioxide, a noble gas or mixtures thereof.

The substances can be used in the invention either singly or as mixtures of one or more different substances.

The term "waste water", as used herein, covers any aqueous liquid comprising at least 75% by weight (preferably at least 85% by weight, more preferably at least 95% by weight) of water. Suitably, the waste water is intended for discharge into the environment eg, via a sewage system or into a river or stream. The waste water is preferably discoloured but may also contain undesirable bacteria.

The waste water may be produced as a by-product of a domestic process or an industrial process. Domestic processes include the laundering of fabric (eg, garments) and the preparation of foodstuffs. Industrial processes include those involving the processing of textiles, foodstuffs, beverages, pharmaceuticals, cosmetics, plastics, paper products, leather, printing inks, paint, varnish, lacquer, wood, stain and other coatings. Generally, the waste water will be discoloured, for example due to the presence of a dye (such as an organic dye) in the waste water.

The treatment of waste water according to the method of the invention is particularly suitable for the discoloration of waste water from a fabric laundering process (either industrial or domestic).

Discoloration of water in the wash or the rinse cycle of a fabric laundering process can present a number of problems, including: dye transfer in the wash (ie, transfer of dye from one item of fabric to another); staining of washing apparatus and/or containers; the discharge of coloured water which might appear unsuitable for further uses (eg, watering plants); and undesirable aesthetic qualities.

The treatment of waste water from a fabric laundering process can take place in the wash itself or during the rinse cycle, in which case the substance may be incorporated into a fabric treatment composition (eg, a main wash detergent or a fabric conditioner).

Preferably, however, the treatment of the waste water is carried out after the waste water has been separated from the fabric. The waste water may be treated after separation from the fabric by, for example, passage through a treatment zone comprising the substance (eg, coated onto a substrate) at an elevated temperature or under illumination.

The invention will now be illustrated by reference to the following nonlimiting examples.

All experiments were performed in water at ambient temperature unless otherwise stated.

Irgacure 2959 (trade mark) is (1-[4-(2-hydroxyethoxy)-phenyl]-2-hydroxy-2-methyl-1-propane-1-one and was obtained from Ciba Speciality Chemicals.

Lucirin TPO-L (trade mark) is (2,4,6-trimethylbenzoyl) phenyl phosphinic acid ethyl ester and was obtained from BASF.

Azo-bis-iso-butyronitrile (ABIBN) was obtained from Aldrich Chemicals. Irgacure 2959, Lucirin TPO-L and ABIBN are sold as radical photoinitiators for use in free radical polymerisation reactions and polymer cross-linking reactions.

EXAMPLE 1

A $4 \times 10^{-6}$ molar solution of the dye Congo Red (ex Aldrich) was prepared. To this was added Irgacure 2959 (trade mark) such that its concentration was $4.4 \times 10^{-3}$ molar. The solution was placed in a glass jar in a weatherometer (WOM) for 12 minutes. At the eud of this time the red solution had been completely decolourised (visual inspection), and the absorbance at 500 nm had dropped from 0.2 to 0.05 (1 cm path length). A control solution without initiator did not change colour or absorbance on irradiation.

EXAMPLE 2

Solutions containing various concentrations of the reactive dye Procion blue HE-XL (a mixture of anthraquinone and hydrazone dyes) and Irgacure 2959 (trade mark) were prepared. They were placed in plastic cuvettes and irradiated in a WOM for 6 minutes. Those solutions that contained Irgacure 2959 (trade mark) were decolourised (visual inspection). The results are summarised in the table below.

| [Procion blue HE-XL]/ % wt in solution | [Irgacure 2959]/ % wt in solution | Absorbance at 630 nm (1 cm path length) | |
|---|---|---|---|
| | | before irrad. | after irrad. |
| 0.005 | 0 | 0.42 | 0.42 |
| 0.005 | 0.0025 | 0.42 | 0.080 |
| 0.005 | 0.0050 | 0.42 | 0.097 |
| 0.005 | 0.010 | 0.42 | 0.030 |
| 0.005 | 0.020 | 0.42 | 0.010 |
| 0.005 | 0.030 | 0.42 | 0.018 |
| 0.005 | 0.040 | 0.42 | 0.017 |
| 0.009 | 0.010 | 0.76 | 0.10 |
| 0.006 | 0.010 | 0.51 | 0.067 |
| 0.003 | 0.010 | 0.25 | 0.054 |

EXAMPLE 3

The experiments in example 2 were repeated using Procion red HE-GXL (hydrazone dye) and separately Procion yellow HE-6G (azo dye). Two irradiation periods were now used: 6 and 35 minutes. Again Irgacure 2959 (trade mark) decolourised the solutions. The results are summarised in the following tables.

| [Procion red HE-GXL]/ % wt in solution | [Irgacure 2959]/ % wt in solution | Absorbance at 540 nm (1 cm path length) | | |
|---|---|---|---|---|
| | | before irrad. | 6 mins | 35 mins |
| 0.005 | 0 | 0.99 | 1.00 | 1.00 |
| 0.005 | 0.0025 | 0.99 | 0.22 | 0.062 |
| 0.005 | 0.0050 | 0.99 | 0.098 | 0.046 |
| 0.005 | 0.010 | 0.99 | 0.030 | 0.015 |
| 0.005 | 0.020 | 0.99 | 0.040 | 0.028 |
| 0.009 | 0.010 | 1.78 | 0.29 | — |
| 0.006 | 0.010 | 1.20 | 0.080 | — |
| 0.003 | 0.010 | 0.59 | 0.050 | — |

| [Procion yellow HE-6G]/ % wt in solution | [Irgacure 2959]/ % wt in solution | Absorbance at 420 nm (1 cm path length) | | |
|---|---|---|---|---|
| | | before irrad. | 6 mins | 35 mins |
| 0.005 | 0 | 0.68 | 0.68 | 1.00 |
| 0.005 | 0.0025 | 0.68 | 0.17 | 0.062 |
| 0.005 | 0.0050 | 0.68 | 0.057 | 0.046 |
| 0.005 | 0.010 | 0.68 | 0.034 | 0.015 |
| 0.005 | 0.020 | 0.68 | 0.024 | 0.028 |
| 0.009 | 0.010 | 1.24 | 0.31 | — |
| 0.006 | 0.010 | 0.82 | 0.17 | — |
| 0.003 | 0.010 | 0.41 | 0.027 | — |

EXAMPLE 5

When Lucirin TPO-L (trade mark) was used in the experiments of Examples 2 and 3, decolourisation of the water was observed, even though this initiator is substantially water-insoluble.

EXAMPLE 6

Various direct dyes were separately dissolved in water and Irgacure 2959 (trade mark) added. They were then irradiated for 12 minutes in a WOM, in glass jars. Decolourisation of the water was observed and the results are summarised in the table below. In all experiments, Irgacure 2959 (trade mark) was used at 0.034% wt in solution.

| dye | [dye]/ % wt in solution | initial absorbance | absorbance after irradiation |
| --- | --- | --- | --- |
| Dyrect fast sky blue GD | 0.0050 | 0.46 (400 mn) | 0.092 |
| dyrect orange GR (stilbene dye) | 0.0021 | 1.22 (400 nm) | 0.80 |
| Dyrect yellow LFF (azo dye) | 0.0050 | 1.34 (580 nm) | 0.22 |
| dyrect black GR (poly azo dye) | 0.0078 | 0.54 (500 mn) | 0.091 |

EXAMPLE 7

An aqueous solution of the dye Direct Black 22 was heated in the presence of azo-bis-iso-butyronitrile. The solution was decolourised. The loss of colour was much greater than that caused by heating without the initiator. Azo-bis-iso-butyronitrile is substantially insoluble in water.

What is claimed is:

1. Method for treatment of waste water from a fabric laundering or dying process, to remove dissolved colourants which consists essentially of applying to the waste water containing a dissolved colourant of at least one radical photo initiator or radical thermal initiator substance which decomposes by a unimolecular (bond cleavage) mechanism to form a carbon-centred radical on exposure to light or to heat.

2. Method according to claim 1, wherein the waste water comprises a dye.

3. Method according to claim 2, wherein the dye is an organic dye.

4. Method according to claim 1, wherein the waste water comprises micro organisms.

5. Method according to claim 1, wherein the substance forms a carbon-centred radical on exposure to light having a wavelength of from 290 to 800 nm.

6. Method according to claim 1, wherein the substance is a radical photo initiator selected from the group consisting of alpha-amino ketones, alpha-hydroxy ketones, monoacyl and bisacyl phosphine oxides and sulphides, dialkoxy acetophenones, alpha-halo acetophenones, triacyl phosphine oxides and mixtures thereof.

7. Method according to claim 1, wherein the substance forms a carbon-containing radical on heating to a temperature of up to 100° C.

8. Method according to claim 7, wherein the substance comprises an azo group.

9. Method according to claim 1, wherein the treatment of the waste water is carried out after the waste water has been separated from the fabric.

10. Method according to claim 1, wherein the substance is soluble in the waste water.

11. Method according to claim 10, wherein the substance is used at a concentration of $10^{-9}$ M to 1 M.

12. Method according to claim 1, wherein the substance is only slightly soluble in the waste water.

13. Method according to claim 10, wherein the substance is used at a concentration of $10^{-7}$ M to $10^{-4}$ M.

* * * * *